United States Patent
Takazato

(10) Patent No.: US 8,554,415 B2
(45) Date of Patent: Oct. 8, 2013

(54) MOTOR VEHICLE STEERING SYSTEM

(75) Inventor: Akihiro Takazato, Kashiwara (JP)

(73) Assignee: JTEKT Corporation, Osaka-Shi (JP)

( * ) Notice: Subject to any disclaimer, the term of this patent is extended or adjusted under 35 U.S.C. 154(b) by 104 days.

(21) Appl. No.: 13/274,008

(22) Filed: Oct. 14, 2011

(65) Prior Publication Data

US 2012/0101684 A1 Apr. 26, 2012

(30) Foreign Application Priority Data

Oct. 21, 2010 (JP) .................................. 2010-236868

(51) Int. Cl.
  *B62D 6/00* (2006.01)
  *B66F 9/18* (2006.01)
  *B66F 9/06* (2006.01)
(52) U.S. Cl.
  CPC ... *B62D 6/00* (2013.01); *B66F 9/18* (2013.01); *B66F 9/06* (2013.01)
  USPC ................. 701/41; 701/50; 187/222; 414/620
(58) Field of Classification Search
  USPC .............. 701/41, 36, 37, 50, 54, 71; 180/271, 180/272, 273, 290; 340/440; 187/222–238; 414/592, 620
  See application file for complete search history.

(56) References Cited

U.S. PATENT DOCUMENTS

| | | | |
|---|---|---|---|
| 6,398,252 B1 * | 6/2002 | Ishikawa et al. | 280/727 |
| 6,785,597 B1 * | 8/2004 | Farber et al. | 701/50 |
| 7,322,444 B2 * | 1/2008 | Allerding et al. | 187/222 |
| 8,131,422 B2 * | 3/2012 | Jensen et al. | 701/36 |
| 8,140,228 B2 * | 3/2012 | McCabe et al. | 701/50 |
| 8,260,574 B1 * | 9/2012 | Schuitema et al. | 702/183 |
| 2008/0208424 A1 * | 8/2008 | Hartman | 701/70 |
| 2009/0276134 A1 * | 11/2009 | Sherman | 701/82 |

FOREIGN PATENT DOCUMENTS

| | | |
|---|---|---|
| DE | 100 17 358 A1 | 10/2001 |
| JP | Y2-55-022074 | 5/1980 |
| JP | A-61-002698 | 1/1986 |
| JP | A-08-259195 | 10/1996 |
| JP | A-2010-023941 | 2/2010 |

OTHER PUBLICATIONS

Jan. 30, 2012 Search Report issued in European Application No. 11185835.3.

* cited by examiner

*Primary Examiner* — Thomas Tarcza
*Assistant Examiner* — Tyler J Lee
(74) *Attorney, Agent, or Firm* — Oliff & Berridge, PLC

(57) ABSTRACT

A steering system for a motor vehicle equipped with a cargo-handling machine including a pair of left and right loading portions is provided. The steering system includes a turning actuator that turns a steered wheel according to an operation of a steering member, and a side shift actuator that shifts the pair of loading portions in the left-right direction. A control unit that controls driving of the side shift actuator includes a target side shift amount calculating section that calculates a target side shift amount of the pair of loading portions based on lateral acceleration detected by a lateral acceleration sensor.

6 Claims, 7 Drawing Sheets

MOTOR VEHICLE STEERING SYSTEM

FIELD OF THE INVENTION

The present invention relates to a motor vehicle steering system for a cargo-handling vehicle.

DESCRIPTION OF RELATED ARTS

As side shift mechanisms that shift a cargo in the left-right direction, the following Patent Documents 1 to 3 were proposed.

In Patent Document 1, a cargo-handling machine is proposed which adjusts a position of a cargo by driving a spreader in the left-right direction by a side shift mechanism when only one portion of the cargo is in contact with an inclined placing surface or only a portion of the cargo is away from the placing surface in a process of lowering or lifting the cargo hung on the spreader.

In Patent Document 2, a cargo control device in a cargo-handling vehicle is proposed which prevents operations from becoming unsafe due to loading bias by rearranging the gravity center of the cargo at a position near the fork center using a side shift mechanism.

In Patent Document 3, a forklift truck working device is proposed in which a vehicle main body and a mast are joined by a plurality of swing cylinders arranged side by side on the circumference, and the swing cylinders are inclined in the arrangement direction and aligned in the form of a truss to construct a parallel link mechanism. In Patent Document 3, by swinging the forks forward and backward, up and down, and leftward and rightward, alignment with a cargo is easily performed without making the motor vehicle travel, and accordingly, the workability of the cargo transportation work is improved.

On the other hand, in a forklift truck position control device, a technique for restricting mast rearward tilting and extending operations when it is determined that a gravity center position projected point obtained by projecting the gravity center position detected by a gravity center position detection means is out of the stability region (for example, refer to Patent Document 4).

Patent Document 1: Japanese Published Unexamined Patent Application No. S61-2698 (FIG. 6, FIG. 13, and line 6 in the lower left column to line 15 in the lower right column of page 3 of the specification)

Patent Document 2: Japanese Published Examined Utility Model Application No. S55-22074 (FIG. 1, FIG. 3, line 11 to line 16 of the third column, line 22 to line 24 of the third column, line 36 to line 38 of the third column, and line 6 to line 12 of the fifth column of the specification)

Patent Document 3: Japanese Published Unexamined Patent Application No. H08-259195 (FIG. 2, FIG. 3, and ABSTRACT)

Patent Document 4: Japanese Published Unexamined Patent Application No. 2010-23941 (FIG. 3, FIG. 4, FIG. 7, and ABSTRACT)

The steered wheel of a cargo-handling vehicle such as a forklift truck is generally a rear wheel. Therefore, the steered angle tends to become large and steering tends to become abrupt. In addition, a cargo-handling vehicle such as a forklift truck has a cargo loading position away from the gravity center of the motor vehicle, so that the lateral weight (moment) to be applied to the motor vehicle due to the weight of a cargo changes during traveling.

In particular, it is important to note that when a cargo with a heavy weight is loaded on the motor vehicle, if abrupt steering is performed or the motor vehicle comes into contact with an obstacle, etc., or passes over a bump and lateral acceleration is applied, the cargo slides laterally on the forks and drops off, or the motor vehicle is shaken laterally and the traveling becomes unstable.

SUMMARY OF THE INVENTION

An object of the present invention is to provide a motor vehicle steering system that can stabilize a cargo during traveling and secure stable traveling.

According to an aspect of the present invention, a steering system for a motor vehicle equipped with a cargo-handling machine including a pair of left and right loading portions includes a turning actuator that turns a steered wheel according to an operation of a steering member, a side shift actuator that shifts the pair of loading portions in the left-right direction, a lateral acceleration sensor that detects lateral acceleration, and a control unit that controls driving of the side shift actuator. The control unit includes a side shift amount calculating section that calculates a target side shift amount of the pair of loading portions based on lateral acceleration detected by the lateral acceleration sensor.

According to the present invention, even when a motor vehicle is abruptly steered, comes into contact with an obstacle, or passes over a bump, by side-shifting the loading portions such as forks according to lateral acceleration, a cargo can be stabilized during traveling. Accordingly, a cargo on the loading portions can be prevented from moving in the left-right direction, and the posture of the motor vehicle can be stabilized. Additionally, stable traveling of the motor vehicle is secured.

DETAILED DESCRIPTION OF THE PREFERRED EMBODIMENT

A preferred embodiment of the present invention will be described with reference to the accompanying drawings.

Figure 1:
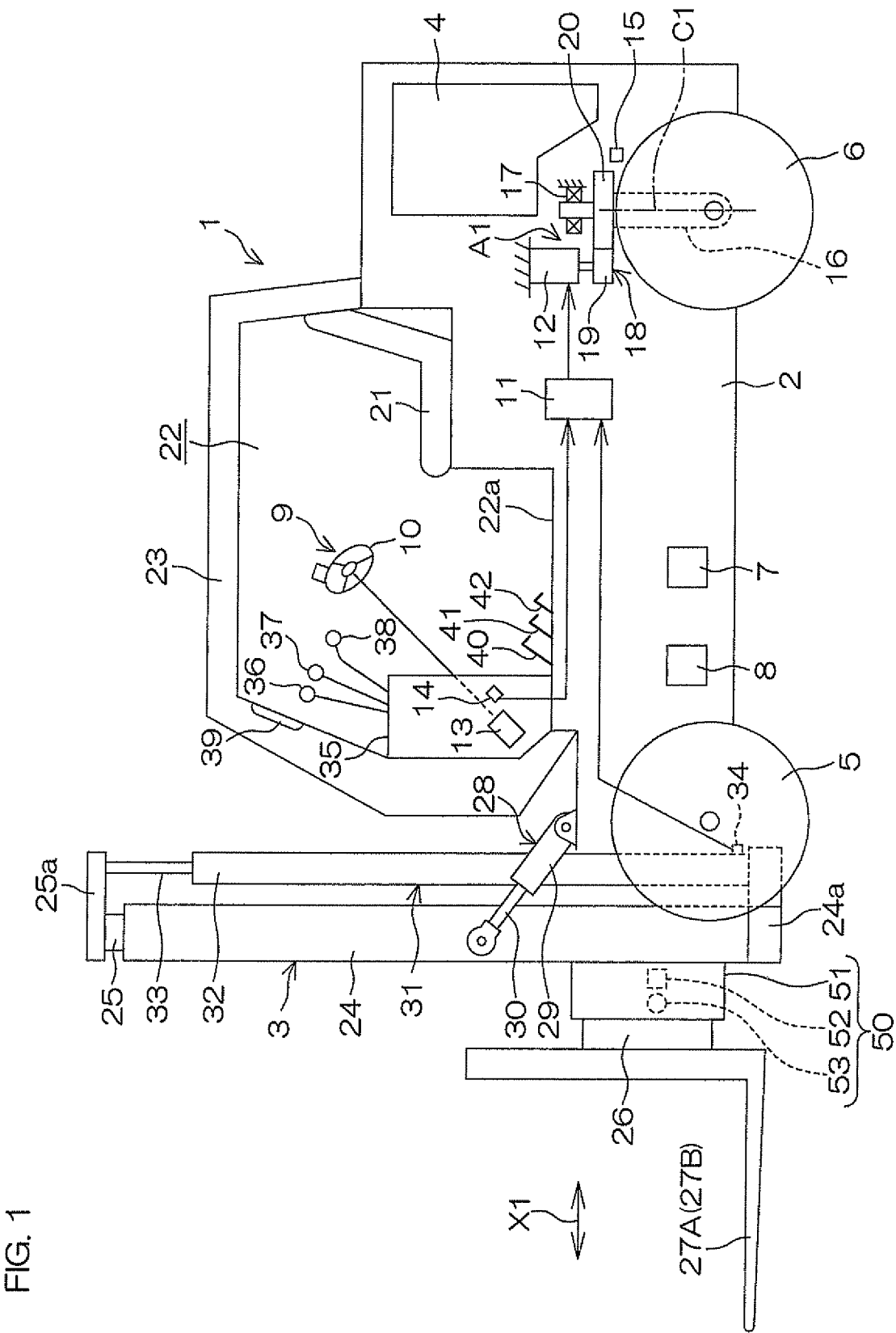
FIG. 1 is a schematic side view showing a general configuration of a forklift truck as a cargo-handling vehicle including a motor vehicle steering system according to a preferred embodiment of the present invention.

FIG. 1 is a schematic side view showing a general configuration of a forklift truck as a cargo-handling vehicle according to a preferred embodiment of the present invention. Referring to FIG. 1, the forklift truck 1 includes a vehicle body 2, a cargo-handling machine 3 provided on the front portion of the vehicle body 2, a counter weight 4 provided on the rear portion of the vehicle body 2, front wheels 5 as drive wheels and a rear wheel 6 as a steered wheel which support the vehicle body 2, a motor vehicle drive source 7 including, for example, an engine, a hydraulic pump 8 as a hydraulic pressure source, a motor vehicle steering system 9 for turning the rear wheel 6.

The motor vehicle steering system 9 is configured as a so-called steer-by-wire motor vehicle steering system in which mechanical joining between a steering member 10 that is a hand-turned handle with a knob and the rear wheel 6 as a steered wheel is cut off. As the steered wheel, a single rear wheel 6 may be provided at the center in the left-right direction of the vehicle body 2, or rear wheels 6 may be provided on the left and right of the vehicle body 2.

The motor vehicle steering system 9 includes the steering member 10, a turning actuator 12 that consists of, for example, an electric motor for turning the rear wheel 6 as a steered wheel according to an operation of the steering member 10, and driving of which is controlled by an ECU 11 (electronic control unit) as a control unit, a reaction force actuator 13 which consists of, for example, an electric motor to apply a steering reaction force to the steering member 10 and driving of which is controlled by the ECU 11. Further, the motor vehicle steering system 9 includes a steering angle sensor 14 that detects a steering angle of the steering member 10, and a steered angle sensor 15 that detects a steered angle of the rear wheel 6.

The rear wheel 6 as a steered wheel is supported rotatably by a substantially vertical support member 16. The support member 16 is supported rotatably around a substantially vertical rotation axis C1 via a bearing 17 held on the vehicle body 2.

Rotation of an output shaft of the turning actuator 12 is decelerated via a transmission mechanism 18 and transmitted to the support member 16. This transmission mechanism 18 includes a drive member 19 consisting of, for example, a drive gear that rotates integrally with the output shaft of the turning actuator 12, and a driven member 20 consisting of, for example, a driven gear that is provided rotatably integrally with the support member 16 around the rotation axis C1 and meshes with the drive gear. The transmission mechanism 18 and the turning actuator 12 constitute a turning mechanism A1.

Power of a drive source 7 such as an engine is transmitted to a transmission that performs switching between forward traveling and backward traveling and a speed change operation via a torque converter, and is further transmitted to the left and right front wheels 5 (drive wheels) via a differential although this is not shown. The transmission includes a forward clutch and a backward clutch inside.

The forklift truck 1 includes an operator's cab 22 having a driver seat 21. The operator's cab 22 is formed to be surrounded by a frame 23 on the vehicle body 2.

The cargo-handling machine 3 includes a pair of left and right outer masts 24 supported by the vehicle body 2 so as to tilt around the lower end portion 24a, inner masts 25 supported by the outer masts 24 movably up and down, a lift bracket 26 supported by the outer masts 24 movably up and down, and first and second forks 27A and 27B as loading portions which are attached to the lift bracket 26 and on which a cargo is loaded.

Figure 3:
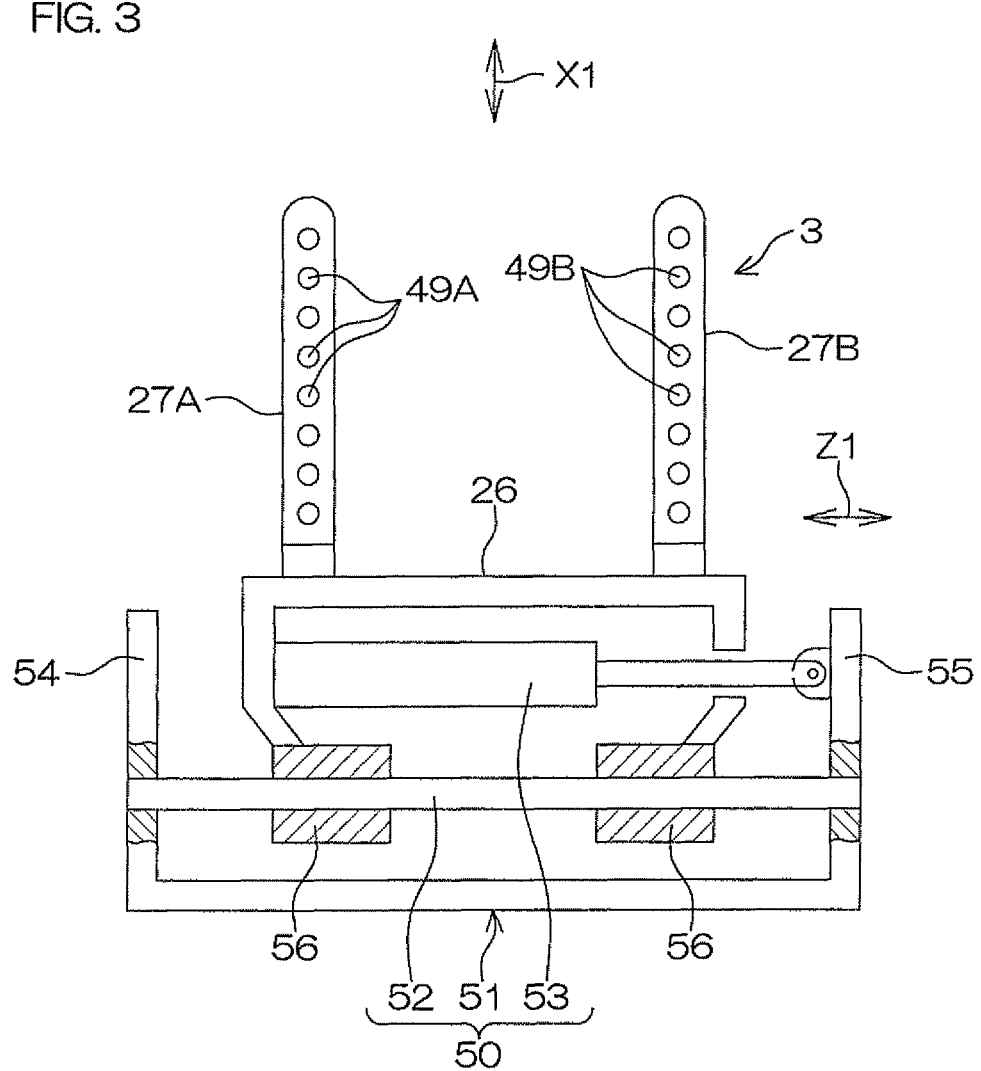
FIG. 3 is a partial sectional plan view of a side shift mechanism and the vicinity thereof.

Referring to FIG. 1 and FIG. 3, the cargo-handling machine 3 includes a side shift mechanism 50 that shifts the first and second forks 27A and 27B as loading portions laterally leftward or rightward (sideways). The side shift mechanism 50 includes a carriage 51 supported movably up and down by the outer masts 25, a guide bar 52 that is fixed to the carriage 51 and supports the lift bracket 26 movably in the left-right direction Z1 (refer to FIG. 3. equivalent to a direction orthogonal to the paper surface in FIG. 1), and a side shift actuator 53 that shifts the first and second forks 27A and 27B in the left-right direction Z1 (sideways) by driving the lift bracket 26 in the left-right direction Z1.

Referring to FIG. 1, between a predetermined portion of the outer mast 24 and a predetermined portion of the vehicle body 2, a tilt cylinder 28 is interposed. The tilt cylinder 28 includes a cylinder main body 29 that has an end joined swingably to the predetermined portion of the vehicle body 2, and a rod 30 that projects from the other end of the cylinder main body 29. The tip end of the rod 30 is joined swingably to the predetermined portion of the outer mast 24. According to an extending and contracting operation of the rods 30 of the tilt cylinders 28, the outer masts 24 are displaced to turn into an erecting posture and a tilting posture.

Further, lift cylinders 31 for moving up and down the inner masts 25 by using the outer masts 24 as guides are provided. The lift cylinder 31 includes a cylinder main body 32 fixed to the outer mast 24, and a rod 33 projecting from the cylinder main body 32. The tip end of the rod 33 is fixed to an attaching portion 25a provided on the predetermined portion of the inner mast 25.

To the lower portion of the cylinder main body 32 of the lift cylinder 31, a weight sensor 34 as a weight detection means for detecting a load weight on the cargo-handling machine 3 is attached. A signal from the weight sensor 34 is input into the ECU 11.

At the front portion of the operator's cab 22, on the bottom surface 22a of the operator's cab 22, an operation stand 35 is provided, and at the rear portion of the operator's cab 22, the driver seat 21 is fixed.

On the operation stand 35, as a plurality of operation elements to be operated by a driver's hand, the steering member 10, an up/down operation lever 36 for moving up and down the first and second forks 27A and 27B, a tilting operation lever 37 for swinging the outer masts 24, and a forward/backward switching lever 38, are provided. To the operation stand 35, a confirmation mirror 39 for confirming mainly the back side is fixed. On the operation stand 35, various switches not shown are provided.

Near the base portion of the operation stand 35, on the bottom surface 22a of the operator's cab 22, as a plurality of operation elements to be operated by a driver's foot, an acceleration pedal 40, a brake pedal 41, and a clutch pedal 42 are provided. In actuality, the acceleration pedal 40, the brake pedal 41, and the clutch pedal 42 are arranged side by side in the direction perpendicular to the paper surface (equivalent to the left-right direction of the motor vehicle), and they are schematically shown in FIG. 1. In FIG. 1, the layout of the up/down operation lever 36, the tilting operation lever 37, and the forward/backward switching lever 38 as operation elements are also schematically shown.

Figure 2:
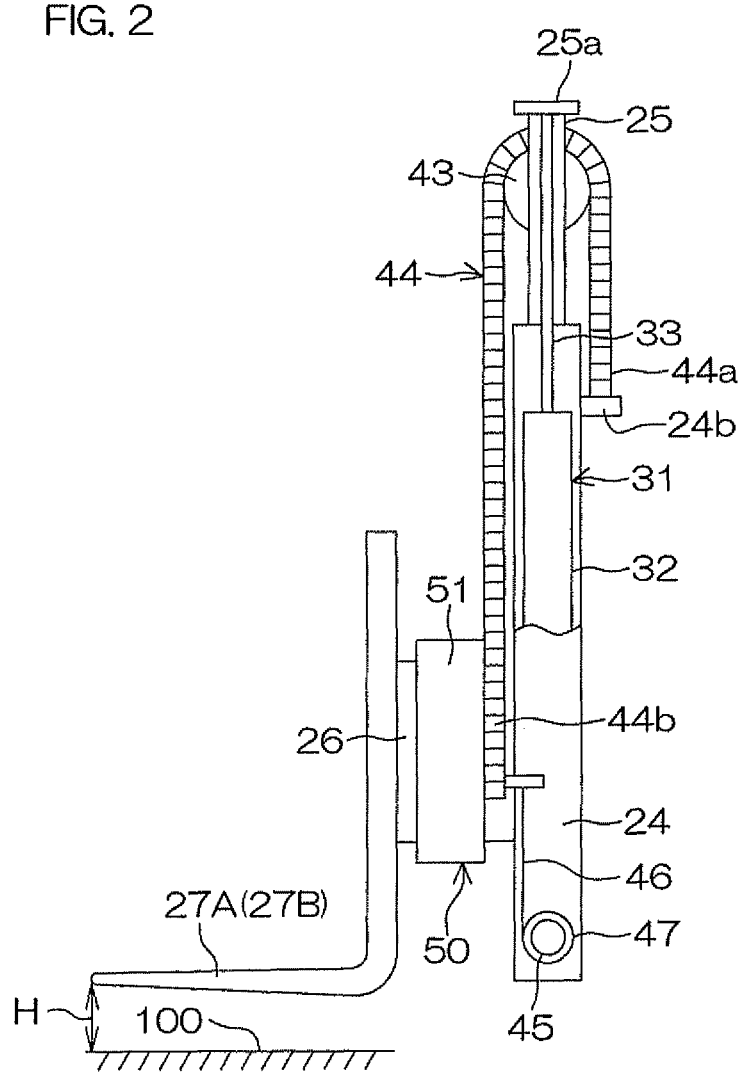
FIG. 2 is a general view for describing the operation principle for moving up and down forks.

Referring to FIG. 2 conceptually showing the operation principle for moving up and down the forks 27A and 27B, on the upper portions of the inner masts 25, sprockets 43 are supported rotatably, and around the sprockets 43, chains 44 are wound. One end 44a of the chain 44 is fixed to a fixing portion 24b provided on the outer mast 24, and the other end 44b of the chain 44 is fixed to the carriage 51 of the side shift mechanism 50. Accordingly, the side shift mechanism 50, the lift bracket 26, and the forks 27A and 27B are suspended by using the chains 44.

According to extension of the rods 33 of the lift cylinders 31, when the inner masts 25 move up, the sprockets 43 move up with respect to the fixing portions 24b of the outer masts 24, and move up the side shift mechanism 50, the lift bracket 26 and the forks 27A and 27B as loading portions via the chains 44. The moving-up amount of the forks 27A and 27B with respect to the ground surface 48 is twice the extension amount of the rods 33 of the lift cylinders 31.

Stroke sensors 45 as loading portion height detection means for detecting heights of the forks 27A and 27B as loading portions are provided, and signals from the stroke sensors 45 are input into the ECU 11. Rotary encoders may be used as the stroke sensors 45.

In detail, wires 46 one ends of which are latched on the other ends 44b of the chains 44 are reeled by wire drums 47 supported rotatably on the outer masts 24, and when the other ends 44b of the chains 44 move up or down together with the forks 27A and 27B, the wires 46 are unreeled or reeled by the wire drums 47. At this time, the ECU 11 detects the numbers of rotations of the wire drums 47 by rotary encoders as the stroke sensors 45, and based on the detected values, calculates unreeled amounts of the wires 46 from the wire drums 47, and based on the calculated values, detects the loading portion heights H that are the heights of the forks 27A and 27B from the ground surface 48.

FIG. 3 is a partial sectional plan view of the side shift mechanism 50. As shown in FIG. 3, on the first fork 27A as a loading portion, a plurality of first weight sensors 49A are aligned along the longitudinal direction (front-rear direction X1). On the second fork 27B as a loading portion, a plurality of weight sensors 49B are aligned along the longitudinal direction (front-rear direction X1). A total of weights detected by the plurality of first weight sensors 49A is a load weight on the first fork 27A. A total of weights detected by the plurality of second weight sensors 49B is a load weight on the second fork 27B.

The carriage 51 supported movably up and down by the outer masts 25 have a pair of side plates 54 and 55. A guide bar 52 that supports the lift bracket 26 movably in the left-right direction Z1 extends in the left-right direction Z1, and one end of the guide bar 52 is fixed to one side plate 54 of the carriage 51, and the other end of the guide bar 52 is fixed to the other side plate 55 of the carriage 51.

Guide bosses 56 fixed to the lift bracket 26 are fitted slidably to the guide bar 52. Sections of the guide bosses 56 and the guide bar 52 have odd shapes such as rectangular shapes and O-shapes, and the guide bosses 56 are restricted from rotating with respect to the guide bar 52.

The side shift actuator 53 consists of a hydraulic cylinder interposed between the side plate 55 of the carriage 51 and the lift bracket 26. According to extension or contraction of the side shift actuator 53, the lift bracket 26 moves in the left-right direction Z1 with respect to the carriage 51. Accordingly, the forks 27A and 27B as loading portions are side-shifted.

Figure 4:
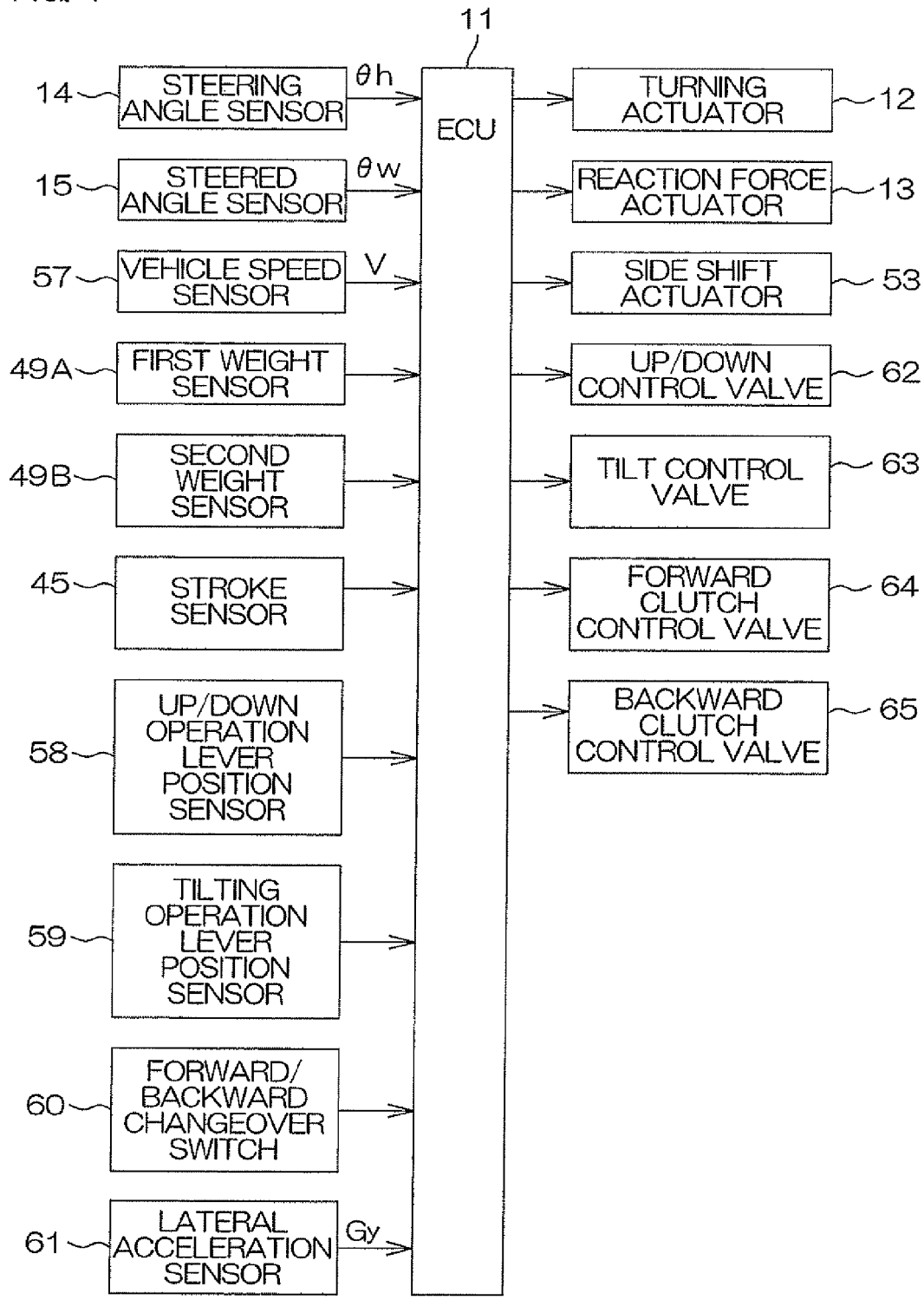
FIG. 4 is a block diagram of an electric configuration of the forklift truck.

FIG. 4 is a block diagram showing a main electric configuration of the forklift truck 1. Referring to FIG. 4, into the ECU 11, signals are input from the steering angle sensor 14 for detecting a steering angle Oh of the steering member 10, a steered angle sensor 15 for detecting a steered angle Ow of the rear wheel 6 as a steered wheel, and a vehicle speed sensor 57 for detecting a vehicle speed. Further, into the ECU 11, signals are input from the weight sensors 49A as weight detection device for detecting a load weight on the first fork 27A as a loading portion and the weight sensors 49B as weight detection means for detecting a load weight on the second fork 27B as a loading portion.

Further, into the ECU 11, signals are input from the stroke sensors 45 as loading portion height detection device for detecting loading portion heights H that are the heights of the fork 27A and 27B as loading portions, an up/down operation lever position sensor 58 for detecting a position of the up/down operation lever 36, and a tilting operation lever position sensor 59 for detecting a position of the tilting operation lever 37. Further, into the ECU 11, signals are input from the forward/backward changeover switch 60 that operates according to switching of the forward/backward switching lever 38, and the lateral acceleration sensor 61 as a lateral acceleration detection device for detecting lateral acceleration Gy (equivalent to acceleration in the left-right direction Z1).

From the ECU 11, signals are output to the turning actuator 12, the reaction force actuator 13, the side shift actuator 53, an up/down control valve 62 configured by a solenoid proportional control valve that controls supply of a hydraulic oil from the hydraulic pump 8 to the lift cylinders 31, and a tilt control valve 63 configured by a solenoid proportional control valve that controls supply of the hydraulic oil from the hydraulic pump 8 to the tilt cylinders 28. Further, from the ECU 11, signals are output to a forward clutch control valve 64 configured by a solenoid proportional control valve that controls supply of the hydraulic oil to a hydraulic cylinder for engaging/disengaging the forward clutch, and a backward clutch control valve 65 configured by a solenoid proportional control valve that controls supply of the hydraulic oil to a hydraulic cylinder for engaging/disengaging the backward clutch.

The ECU 11 performs various controls. For example, the ECU 11 controls driving of the reaction force actuator 13 (that is, performs reaction force control) based on a steering angle input from the steering angle sensor 14 and a vehicle speed input from the vehicle speed sensor 57 so as to make the reaction force actuator 13 generate a torque for applying a steering reaction force corresponding to a road surface reaction force to the steering member 10.

In addition, the ECU 11 outputs a control signal to the up/down control valve 62 that controls supply of the hydraulic oil from the hydraulic pump 8 to the lift cylinders 31 according to a position of the up/down operation lever 36 input from the up/down operation lever position sensor 58.

In addition, the ECU 11 outputs a control signal to the tilt control valve 62 that controls supply of the hydraulic oil from the hydraulic pump 8 to the tilt cylinders 28 according to a position of the tilting operation lever 37 input from the tilting operation lever position sensor 59.

In addition, the ECU 11 outputs a control signal to the forward clutch control valve 64 in response to switching to forward of the forward/backward changeover switch 60 so that the hydraulic oil from the hydraulic pump 8 is supplied to the hydraulic cylinder for actuating the forward clutch.

In addition, the ECU 11 outputs a control signal to the backward clutch control valve 65 in response to switching to backward of the forward/backward changeover switch 60 so that the hydraulic oil from the hydraulic pump 8 is supplied to the hydraulic cylinder for actuating the backward clutch.

Figure 5:
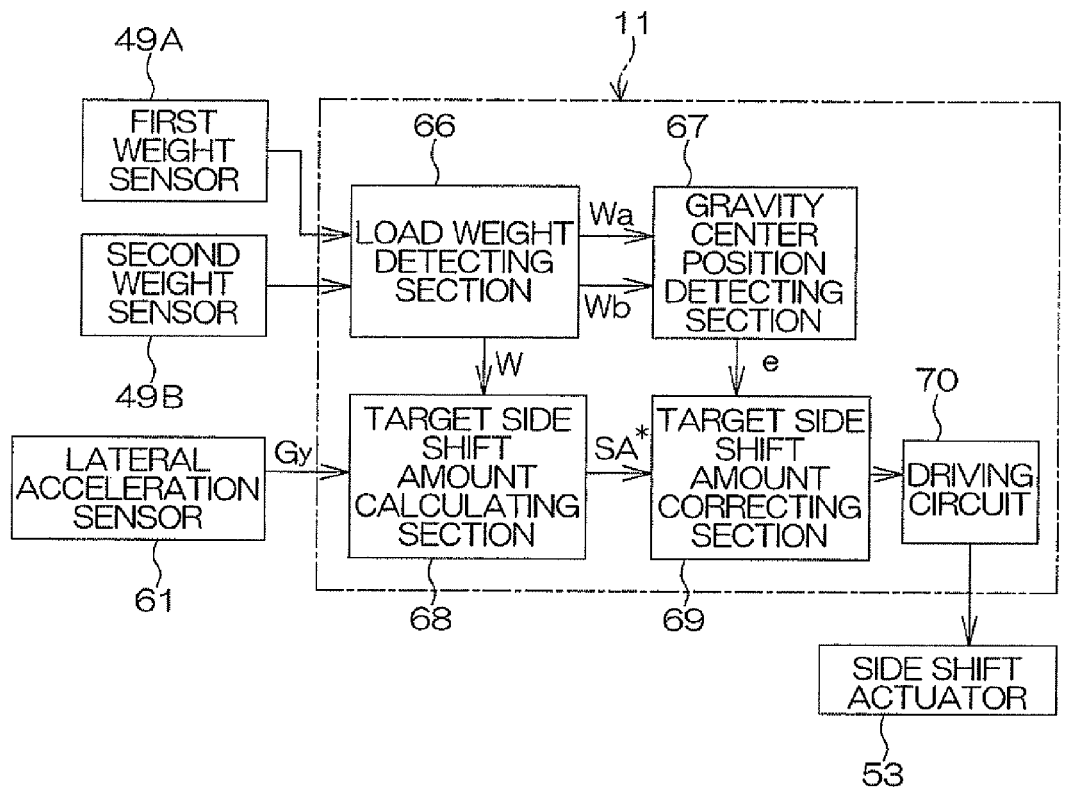
FIG. 5 is a block diagram of an electric configuration of the forklift truck, mainly showing a configuration relating to control of a side shift actuator.

FIG. 5 is a block diagram of the ECU 11 mainly showing a configuration relating to control of the side shift actuator 53. The ECU 11 includes a load weight detecting section 66, a gravity center position detecting section 67, a target side shift amount calculating section 68, a target side shift amount correcting section 69, and a driving circuit 70.

The load weight detecting section 66 calculates a load weight Wa on the first fork 27A from a total of weight values input from the first weight sensors 49A and calculates a load weight Wb on the second fork 27B from a total of weight values input from the second weight sensors 49B, and sums these load weights Wa and Wb to obtain a load weight W on the forks 27A and 27B (W=Wa+Wb). The load weight W detected by the load weight detecting section 66 is output to the target side shift amount calculating section 68.

Figure 6:
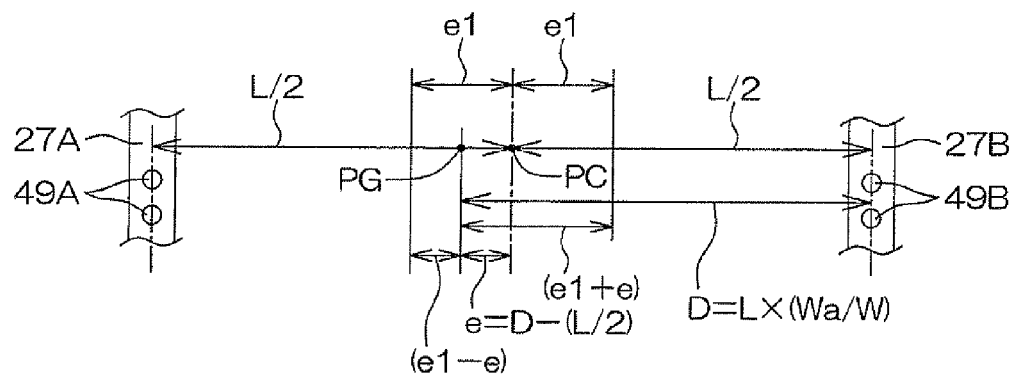
FIG. 6 is an explanatory view for calculating a gravity center position of a cargo.

The gravity center position detecting section 57 receives inputs of the load weight Wa on the first fork 27A and the load weight Wb on the second fork 27B from the load weight detecting section 66, and detects a gravity center position of a cargo in the left-right direction Z1. The gravity center position of the cargo is the position of center of gravity of the cargo. In detail, as shown in FIG. 6, an offset e in the left-right direction Z1 of the gravity center position PG from the center position PC of the vehicle body 2 is detected. The detected offset e is output to the target side shift amount correcting section 69.

When L is the distance in the left-right direction Z1 between the first weight sensors 49A and the second weight sensors 49B, the distance D in the left-right direction Z1 between the gravity center position PG and the second weight sensors 49B is expressed by the following expression (1):

$$D = L \cdot (Wa/W) \tag{1}$$

On the other hand, the offset e of the gravity center position PG from the center position PC in the left-right direction is expressed by the following expression (2):

$$e = D - (L/2) \tag{2}$$

From expressions (1) and (2), the following expression (3) is obtained:

$$e = L - (Wa/W) - (L/2) \tag{3}$$

When the offset e obtained from the expression (3) is a positive value, the gravity center position PG is offset to the first weight sensor 49A side (the first fork 27A side) from the center position PC. On the other hand, when the offset e obtained from the expression (3) is a negative value, the gravity center position PG is offset to the second weight sensor 49B side (the second fork 27B side) from the center position PC.

The target side shift amount calculating section 68 calculates a target side shift amount SA* based on lateral acceleration Gy input from the lateral acceleration sensor 61 and a load weight W input from the load weight detecting section 66.

In detail, the target side shift amount calculating section 68 calculates a lateral weight load W·Gy that is a product of the load weight W and the lateral acceleration Gy when the input lateral acceleration Gy is not less than a predetermined value G1, and based on the obtained lateral weight load W·Gy, calculates a target side shift amount SA* by using a lateral weight load–side shift amount map (W·Gy–SA map, refer to Step S6 of FIG. 7) stored in advance.

When an offset e of the cargo after the cargo offset by the offset e input from the gravity center position detecting section 67 is side-shifted by the target side shift amount SA* input from the target side shift amount calculating section 68 exceeds a limit amount e1, the target side shift amount correcting section 69 corrects the target side shift amount SA* by reducing it so that the offset |e+SA*| (when the offset direction and the side-shifting direction are the same) or |e−SA*| (when the offset direction and the side-shifting direction are opposite to each other) after side-shifting reaches the limit amount e1.

Figure 7:
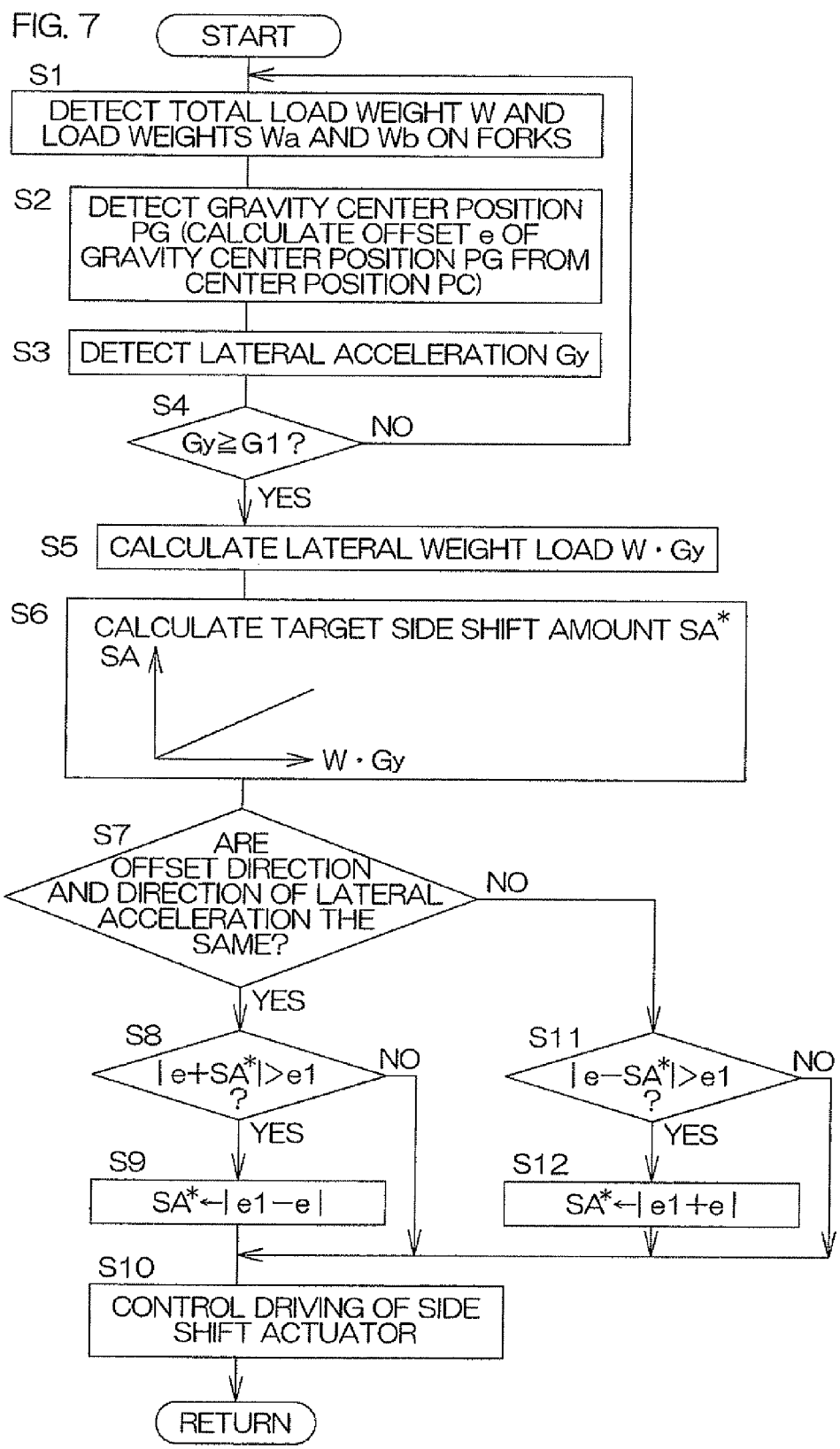
FIG. 7 is a flowchart showing a main flow of control by an ECU.

FIG. 7 is a flowchart showing main operations of the ECU 11. Referring to FIG. 7, first, in Step S1, the ECU 11 detects load weights Wa and Wb on the forks 27A and 27B based on signals from the first and second weight sensors 49A and 49B, and detects a load weight W (W=Wa+Wb) as a whole for the forks 27A and 27B.

Next, in Step S2, the gravity center position detecting section 67 detects a gravity center position PG in the left-right direction. Z1 based on load weights Wa and Wb on the forks 27A and 27B. In detail, the gravity center position detecting section 67 detects an offset e of the gravity center position PG from the center position PC of the vehicle body 2 (refer to FIG. 6).

Next, in Step S3, lateral acceleration Gy is detected based on a signal from the lateral acceleration sensor 61, and it is determined whether the detected lateral acceleration Gy is not less than a predetermined value G1 (Step S4).

In Step S4, when the detected lateral acceleration Gy is less than the predetermined value G1 (NO in Step S4), the process returns to Step S1, and the processes of Steps S1 to S3.

In Step S4, when the detected lateral acceleration Gy is not less than the predetermined value G1 (YES in Step S4), in Step S5, a lateral weight load W·Gy is calculated by multiplying the detected load weight W by the detected lateral acceleration Gy.

Next, in Step S6, the target side shift amount calculating section 68 calculates a target side shift amount SA* based on the calculated lateral weight load W·Gy by using the lateral weight load–side shift amount map (W·Gy–SA map) stored in advance.

In the lateral weight load–side shift amount map (W·Gy–SA map), as the load weight W increases and the lateral acceleration Gy increases, the lateral weight load W·Gy increases, so that the side shift amount SA increases. On the other hand, as the load weight W becomes smaller and the lateral acceleration Gy becomes smaller, the lateral weight load W·Gy becomes smaller, so that the side shift amount SA becomes smaller.

Next, in Step S7, it is determined whether the offset direction of the gravity center position PG and the direction of the lateral acceleration Gy are the same. In Step S7, when the offset direction of the gravity center position PG and the direction of the lateral acceleration Gy are the same (YES in Step S7), the process advances to Step S8, and it is determined whether the offset |e+SA*| after side-shifting exceeds the limit amount e1.

In Step S8, when it is determined that the offset |e+SA*| after side-shifting exceeds the limit amount e1 (YES in Step S8), the process advances to Step S9, and the target side shift amount SA* is corrected by reducing it to |e1−e|. Specifically, the target side shift amount SA* is corrected so that the offset after side-shifting reaches the limit amount e1.

Next, the process advances to Step S10, and based on the target side shift amount SA*, driving of the side shift actuator 53 is controlled via the driving circuit 70 to side-shift the cargo together with the forks 27A and 27B.

On the other hand, in Step S8, when it is determined that the offset |e+SA*| after side-shifting does not exceed the limit amount e1 (NO in Step S8), the process advances to Step S10 by skipping Step S9 (that is, without correcting the target side shift amount SA*).

In Step S7, when the offset direction of the gravity center position PG and the direction of the lateral acceleration Gy are not the same, that is, are opposite to each other (NO in Step S7), the process advances to Step S11, and it is determined whether the offset |e−SA*| after side-shifting exceeds the limit amount e1.

In Step S11, when it is determined that the offset |e−SA*| after side-shifting exceeds the limit amount e1, the process advances to Step S12, and the target side shift amount SA* is corrected by being reduced to |e1+e|. Specifically, the target side shift amount SA* is corrected so that the offset after side-shifting reaches the limit amount e1. Next, the process advances to Step S10, and based on the target side shift amount SA*, driving of the side shift actuator 53 is controlled via the driving circuit 70 to side-shift the cargo together with the forks 27A and 27B.

On the other hand, in Step S11, when it is determined that the offset |e−SA*| after side-shifting does not exceed the limit amount e1 (NO in Step S11), the process advances to Step S10 by skipping Step S12 (that is, without correcting the target side shift amount SA*).

According to the present preferred embodiment, even when an event such as abrupt steering, obstacle contact, and passing over a bump, etc., occurs and the cargo is subjected to lateral acceleration Gy, by side-shifting the forks 27A and 27B and the cargo according to the lateral acceleration Gy, the cargo on the forks 27A and 27B can be prevented from moving in the left-right direction. Accordingly, the cargo can be stabilized during traveling, so that the posture of the forklift truck 1 can be stabilized. Additionally, stable traveling of the forklift truck 1 can be secured.

Generally, as the lateral acceleration Gy becomes larger and the load weight W becomes heavier, the lateral weight to be applied to the cargo increases, and as a result, the cargo on the forks 27A and 27B easily moves in the left-right direction. On the other hand, in the present preferred embodiment, the target side shift amount SA* that becomes larger as the detected lateral acceleration Gy increases, and becomes larger as the load weight W increases, is adopted, so that the cargo on the forks 27A and 27B can be reliably prevented from moving in the left-right direction, and additionally, stable traveling is realized.

In addition, the target side shift amount SA* is corrected so that the offset of the gravity center position PG from the center position PC in the left-right direction Z1 of the vehicle body after side-shifting becomes not more than the limit amount e1, so that the gravity center position PG of the cargo is limited to offset within a predetermined range around the center position PC in the left-right direction Z1 of the vehicle body 2. As a result, excessive side shifting can be suppressed, and stable traveling is realized.

Figure 8:
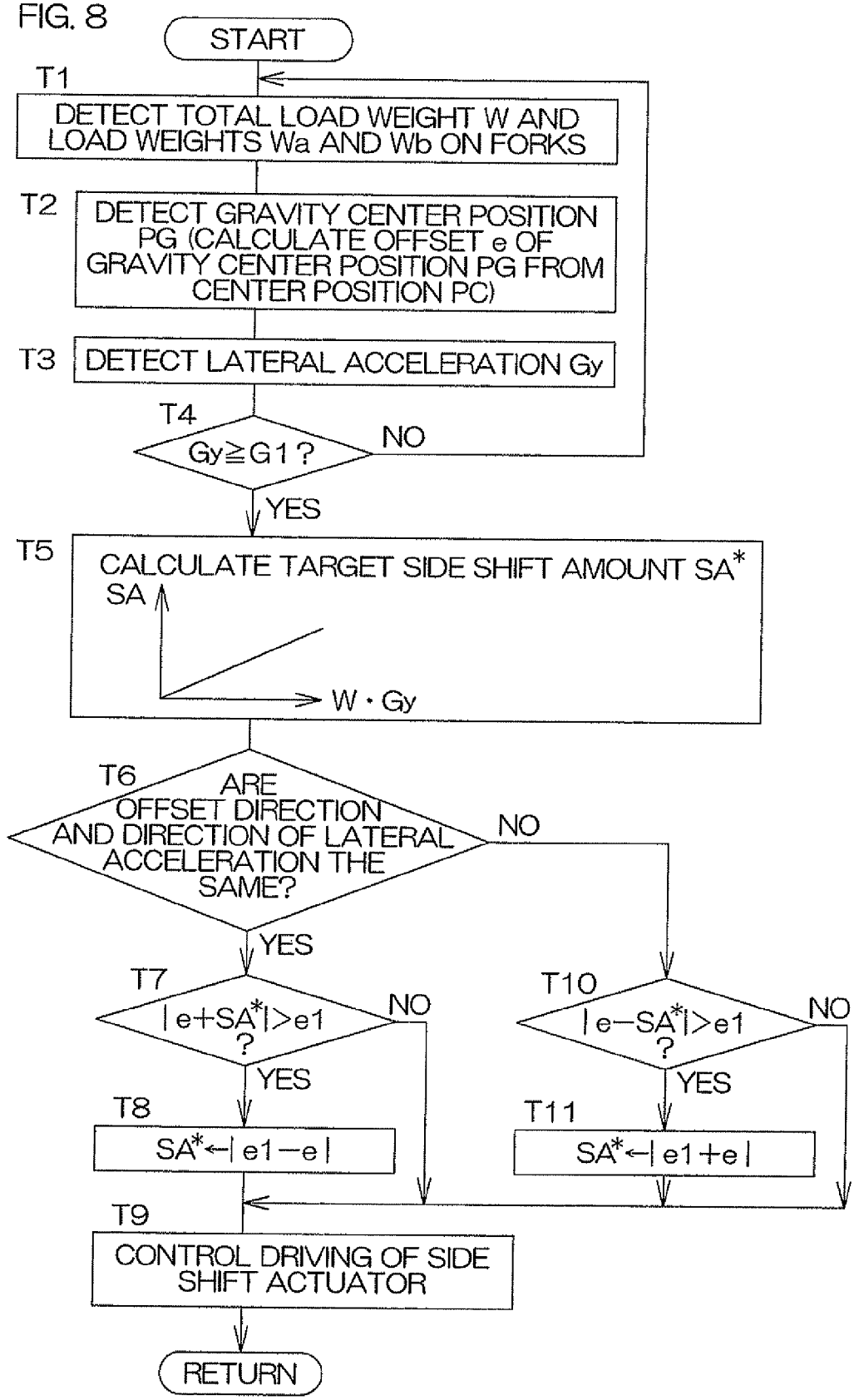
FIG. 8 is a flowchart showing a main flow of control by an ECU in a motor vehicle steering system according to another preferred embodiment of the present invention.

The present invention is not limited to the preferred embodiment described above. For example, in the preferred embodiment of FIG. 7, the lateral weight load W·Gy that is a product of the load weight W and the lateral acceleration Gy is calculated, and in Step S6, by using the lateral weight load−side shift amount map (W·Gy−SA map), the target side shift amount SA* is calculated. Instead of this, as shown in the preferred embodiment shown in FIG. 8, it is also possible that, in Step T5, the target side shift amount SA* is calculated by using a lateral acceleration−side shift amount map (Gy−SA map) in which the side shift amount SA increases as the lateral acceleration Gy becomes larger. Steps T1 to T4 in FIG. 8 are equivalent to Steps S1 to S4 in FIG. 7, and Steps T5 to T11 in FIG. 8 are equivalent to Steps S6 to S12 in FIG. 7.

The present invention is described in detail above based on detailed preferred embodiments, and those skilled in the art who understand the above-described contents may readily conceive modifications, alterations, and equivalents thereto. Therefore, the scope of the present invention should cover the claims and equivalents thereto.

The application of the present invention corresponds to Japanese Patent Application No. 2010-236868 filed in Japan Patent Office on Oct. 21, 2010, whole disclosure of which is incorporated herein by reference.

[Description Of Symbols]

1: Forklift truck (cargo-handling vehicle), 2: Vehicle body, 3: Cargo-handling machine, 6: Rear wheel (steered wheel), 9: Motor vehicle steering system, 10: Steering member, 11: ECU (control section), 12: Turning actuator, 13: Reaction force actuator, 26: Lift bracket, 34: Weight sensor (weight detection device), 50: Side shift mechanism, 51: Carriage, 52: Guide bar, 53: Side shift actuator, 54, 55: Side plate, 56: Guide boss, 61: Lateral acceleration sensor, 66: Load weight detecting section, 67: Gravity center position detecting section, 68: Target side shift amount calculating section, 69: Target side shift amount correcting section, A1: Turning mechanism, e: Offset, e1: Limit amount, Gy: Lateral acceleration, PC: Center position, PG: Gravity center position, SA: Side shift amount, SA*: Target side shift amount, W: Load weight, Wa: (Load weight on first fork) Wb: Load weight (on second fork), W·Gy: Lateral weight load

What is claimed is:

1. A steering system for a motor vehicle equipped with a cargo-handling machine including a pair of left and right loading portions, comprising:
    a turning actuator that turns a steered wheel according to an operation of a steering member;
    a side shift actuator that shifts the pair of loading portions in the left-right direction;
    a lateral acceleration sensor that detects lateral acceleration; and
    a control unit that controls driving of the side shift actuator, wherein
    the control unit includes a target side shift amount calculating section that calculates a target side shift amount of the pair of loading portions based on lateral acceleration detected by the lateral acceleration sensor.

2. The steering system for a motor vehicle according to claim 1, wherein
    the target side shift amount calculating section increases the target side shift amount as the detected lateral acceleration becomes larger.

3. The steering system for a motor vehicle according to claim 1, comprising:
    weight sensors disposed on the respective loading portions, wherein
    the control unit includes a load weight detecting section that detects a load weight based on weights detected by the weight sensors, and
    the target side shift amount calculating section calculates the target side shift amount based on the detected lateral acceleration and the load weight detected by the load weight detecting section.

4. The steering system for a motor vehicle according to claim 3, wherein
    the target side shift amount calculating section increases the target side shift amount as the detected load weight becomes larger.

5. The steering system for a motor vehicle according to claim 3, wherein
    the target side shift amount calculating section increases the target side shift amount as a product of the detected lateral acceleration and the detected load weight becomes larger.

6. The steering system for a motor vehicle according to claim 1, wherein
    the control unit includes a gravity center position detecting section that detects a gravity center position in the left-right direction of a cargo based on weights detected by the weight sensors on the loading portions, and a target side shift amount correcting section that corrects the target side shift amount to limit an offset of the gravity center position detected by the gravity center position detecting section from the center position in the left-right direction of the vehicle body to a predetermined value or less.

* * * * *